(12) United States Patent
Elster et al.

(10) Patent No.: US 6,341,185 B1
(45) Date of Patent: Jan. 22, 2002

(54) EXTRINISIC OPTICAL WAVEGUIDE SENSORS

(75) Inventors: Jennifer L. Elster; Richey M. Davis; Mark E. Jones, all of Blacksburg, VA (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/383,722

(22) Filed: Aug. 26, 1999

(51) Int. Cl.$^7$ .................................................. B02B 6/00
(52) U.S. Cl. .............................. 385/12; 385/31; 385/89; 356/454
(58) Field of Search .............................. 385/12, 13, 31, 385/15, 27, 39, 47, 88, 89, 137; 250/234; 356/454, 477

(56) References Cited

U.S. PATENT DOCUMENTS

| | | | |
|---|---|---|---|
| 5,061,846 A | * 10/1991 | Gergely | 250/227.14 |
| 5,218,426 A | 6/1993 | Hall et al. | |
| 5,237,630 A | * 8/1993 | Hogg et al. | 385/12 |
| 5,301,001 A | 4/1994 | Murphy et al. | |
| 5,367,583 A | * 11/1994 | Sirkis | 385/12 |
| 5,396,328 A | * 3/1995 | Jestel et al. | 356/358 |
| 5,717,518 A | * 2/1998 | Shafer et al. | 359/357 |
| 5,754,293 A | * 5/1998 | Farhadiroushan | 356/477 |
| 5,990,474 A | * 11/1999 | Atia et al. | 250/234 |
| 6,014,477 A | * 1/2000 | Barber et al. | 385/16 |
| 6,071,426 A | * 6/2000 | Lee et al. | 216/24 |

OTHER PUBLICATIONS

K.A. Murphy, C.E. Koob, A.J. Plante S. Desu, R.O. Claus, "High Temperature Sensing Application of Silica and Sapphire Optical Fibers," *SPIE, Fiber Optic Smart Structures and Skins III,* 1990, pp. 169–178, vol. 1370.

C–G Bostan, A. Corici, S. Nan, P.Objera, "An Infrared, Micromachined, Fabry–Perot Interfermeter," *SPIE,* 1997, pp. 721–724, vol. 3110.

M. Andersson, L. Eliasson, and L.R. Pendrill, "Compressible Fabry–Perot Refractometer," *Applied Optics,* Nov. 15, 1987, pp. 4835–4840, vol. 26, No. 22.

N. Khelifa, H. Fang, J. Xu, P. Juncar, and M. Himbert, "Refractometer for Tracking Changes in the Refractive Index of Air Near 780nm," *Applied Optics,* Jan. 1, 1998, pp. 156–161, vol. 37, No. 1.

A. Filippas, E. Fokitis, S. Maltezos, K. Patrinos, "A System for Monitoring the Refractivities of Fluids in the Delphi Rich Detectors in the VUV Regions," *Nuclear Instruments and Methods in Physics Research,* 1996, pp. 255–258, Section A.

* cited by examiner

*Primary Examiner*—Frank G. Font
*Assistant Examiner*—Michael P Mooney
(74) *Attorney, Agent, or Firm*—Joy L. Bryant

(57) ABSTRACT

An extrinsic optical waveguide sensor for making refractive index measurements of an in situ sample is provided. The sensor comprises a holder having at least one sample input region and at least one interferometric region. At least one optical fiber is positioned in the holder, each optical fiber having an endface serving as an input and an output. At least one reflector, each reflector is positioned in the holder in an operable relationship to each optical fiber endface, thus defining each interferometric region.

26 Claims, 8 Drawing Sheets

EXTRINISIC OPTICAL WAVEGUIDE SENSORS

FIELD OF THE INVENTION

The present invention relates to optical waveguide sensors. In particular, it relates to extrinsic optical waveguide sensors having an interferometric region which is used to measure changes in the refractive index of a particular sample.

BACKGROUND OF THE INVENTION

Extrinsic Fizeau interferometric fiber optic sensors have been used for dynamic monitoring of strain, temperature, or pressure in mechanical structures. These types of sensors employ a fiber that acts as a conduit for optical power transmission to and from the sensing element. A typical extrinsic Fizeau interferometer comprises a single-mode fiber, used as an input/output fiber, and a multimode fiber, used purely as a reflector, to form an air gap within a silica tube. The gap acts as a Fizeau cavity. The far end of the multimode fiber is shattered so the reflections from the far end do not add to the detector noise. The Fresnel reflection from the glass/air interface at the front of the air gap (reference reflection) and the reflection from the air/glass interface at the far end of the air gap (sensing reflection) interferes in the input/output fiber. Although multiple reflections occur within the air gap, the effect of the reflections subsequent to the ones mentioned above can be shown to be negligible. The two fibers are allowed to move in the silica tube, and changes in the air gap length cause changes in the phase difference between the reference reflection and the sensing reflection. The phase difference is observed as changes in intensity of the light monitored at the output arm of a fused biconical tapered coupler.

The problem with these types of sensors is that they are only capable of measuring changes in strain, temperature, or pressure in mechanical structures. These types of sensors measure physical path changes such as strain, temperature, and pressure and not optical path differences. In turn, it is not possible to perform macroscopic chemical procedures using these types of sensors. When one desires to measure the refractive indices of various chemical or biological samples in situ, these types of sensors are prohibitive because of their configuration. In particular, the use of a silica tube to form a Fizeau cavity prohibits the introduction of a liquid phase sample into the cavity.

Therefore, it is an object of the present invention to provide an extrinsic optical waveguide sensor which is capable of measuring the refractive index of a sample in situ.

Another object of the present invention is to provide an extrinsic optical waveguide sensor that employs a holder having a sample input region and at least one interferometric region.

Another object of the present invention is to provide a sensor that employs absolute measurement techniques as opposed to relying on an intensity-based signal.

SUMMARY OF THE INVENTION

The aforementioned and other objects were achieved by the extrinsic optical waveguide sensor of the present invention. The sensor comprises a holder having at least one sample input region and at least one interferometric region. At least one optical fiber is positioned in the holder. Each optical fiber has an endface serving as an input and an output. At least one reflector is positioned in the holder in an operable relationship to each optical fiber endface, thus defining each interferometric region.

As a further embodiment, a broadband light source is positioned in an operable relationship to the optical fiber at an end opposite from the optical fiber endface. A coupler is positioned between the broadband light source and the interferometric region. A detector is positioned in an operable relationship to the coupler.

The device of the present invention is used to make in situ measurements of the refractive index of a sample. Examples of the various samples include but are not limited to chemical and biological samples. The present invention offers the advantage of being able to measure optical path differences in a liquid phase sample, something that was previously not achievable with extrinsic optical fiber Fizeau interferometric sensors.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
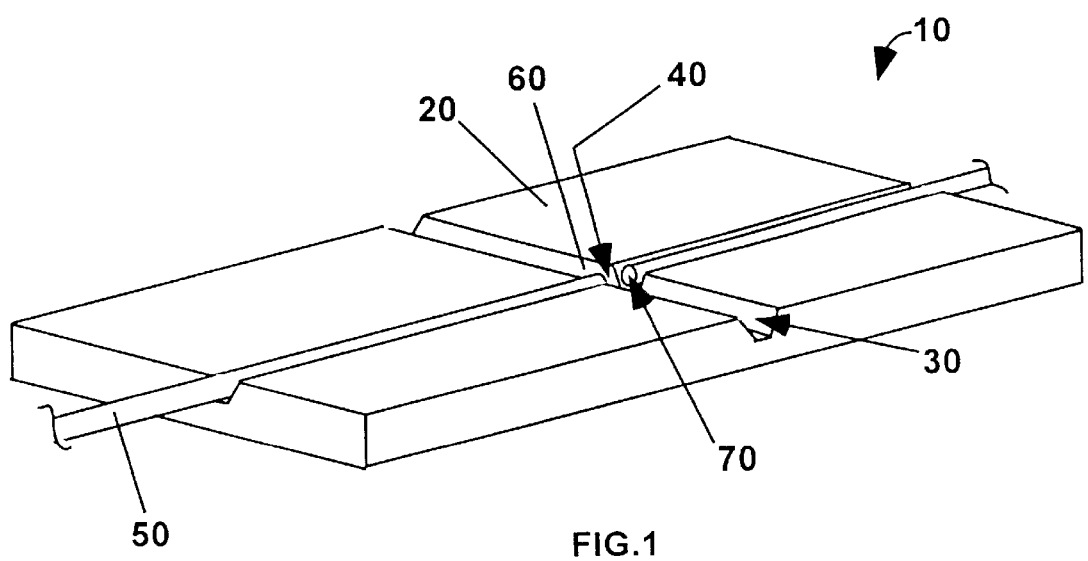
FIG. 1 is a perspective view of the extrinsic optical waveguide sensor of the present invention.

Referring now to the drawings where similar elements are numbered the same. FIG. 1 depicts the extrinsic optical waveguide sensor 10 of the present invention. The sensor 10 comprises a holder 20 having at least one sample input region 30 and at least one interferometric region 40. The holder 20 is prepared from any material known to those skilled in the art. Preferably, the holder is a micromachined silicon wafer. The holder is machined such that it contains grooves for supporting or holding an optical fiber and for the introduction of the sample material to be tested. The surfaces of the holder are exposed. This is in contrast to an extrinsic Fabry-Perot or Fizeau sensor which requires a silica tube to form a Fizeau cavity. At least one optical fiber 50 is positioned within one of the grooves in the holder 20. The optical fiber 50 has an endface 60 that serves as an input and an output for the optical fiber 50. Typically, a single-mode fiber serves this function. At least one reflector 70 is positioned in an operable relationship to each optical fiber endface 60. The operable relationship is defined such that the region or space formed between the optical fiber endface 60 and the reflector 70 is the interferometric region 40. The reflector 70 shown in FIG. 1 is the preferred embodiment, which is an endface of a second optical fiber. Alternatively, the reflector may be a micromachined surface such as a micromachined surface of the holder. A liquid phase sample is introduced into the sensor 10 through the sample input region 30. The sample input region 30 is positioned such that the sample may enter or flow into the interferometric region 40. Preferably, the sample input region 30 is nearly perpendicular to each interferometric region 40.

Figure 2:
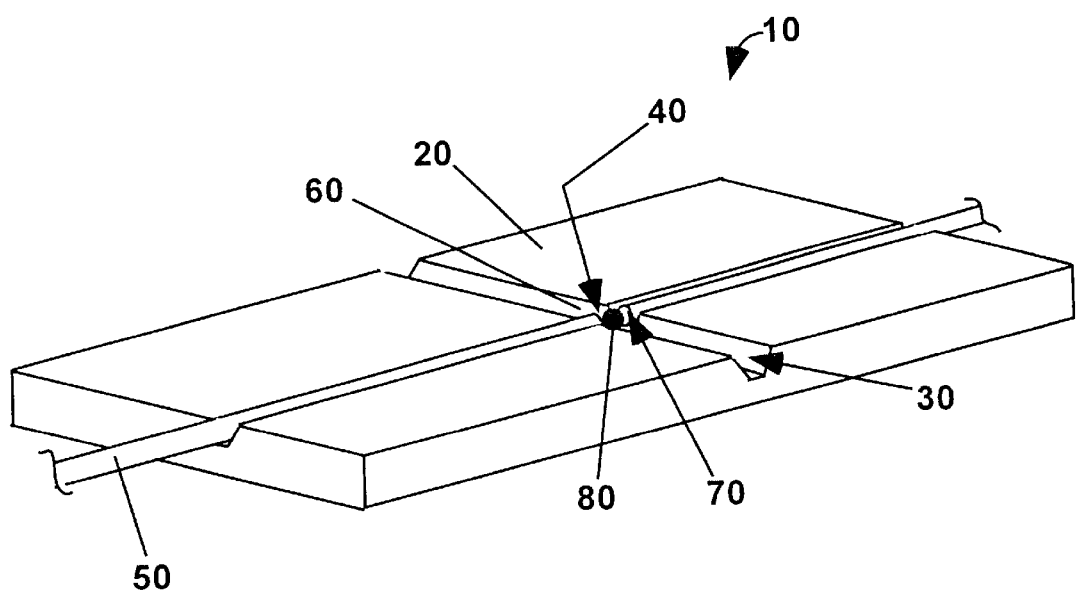
FIG. 2 is a perspective view of the extrinsic optical waveguide sensor where the interferometric region is formed by a lens and a reflector.

FIG. 2 depicts an alternative embodiment of the invention where the interferometric region 40 is formed by a lens 80 that is positioned in an operable relationship to the reflector 70. In this embodiment, the optical fiber 50 is positioned in the holder 20 and the lens 80 is positioned in front of the optical fiber endface 60. The lens 80 is positioned with respect to the output of the optical fiber 50 so as to collimate the light. In a further embodiment, a reflective coating is disposed on the lens 80 on the side of the lens that is exposed to the interferometric region 40. As in FIG. 1, the sample input region 30 is positioned such that the sample may enter or flow into the interferometric region 40. FIG. 2 shows the preferred embodiment where the sample input region 30 is nearly perpendicular to each interferometric region 40.

Figure 3:
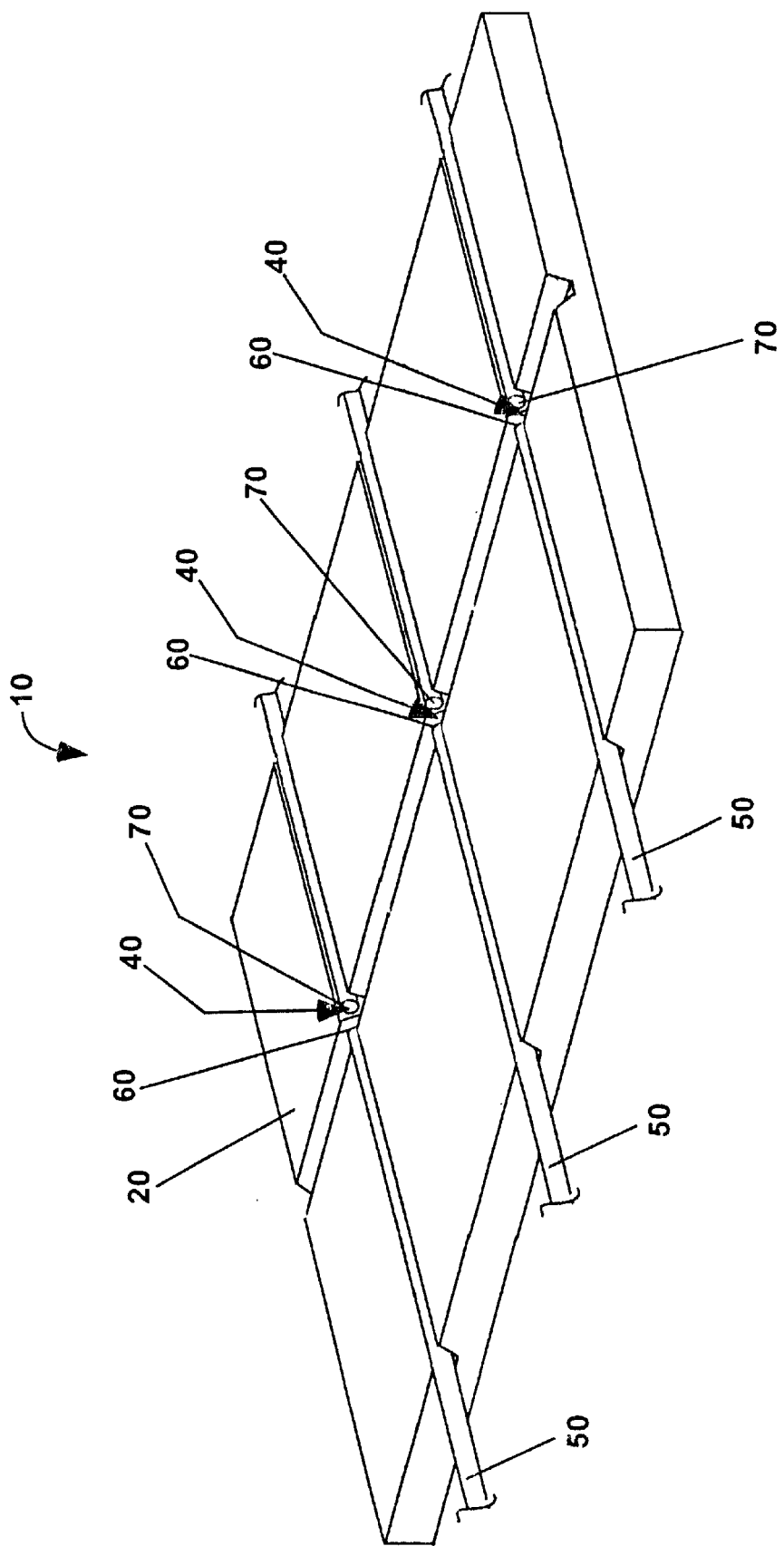
FIG. 3 is a perspective view of the extrinsic optical waveguide sensor where there are a plurality of interferometric regions and a single sample input region.

FIG. 3 is a perspective view of the extrinsic optical waveguide sensor 10 where there are a plurality of interferometric regions 40 in the holder 20. In this arrangement, the endfaces 60 of several optical fibers 50 are positioned in an operable relationship to several reflectors 70 to form the various interferometric regions 40. A single sample input region 30 is provided for introducing samples (typically in the liquid phase) into the sensor 10.

Figure 4:
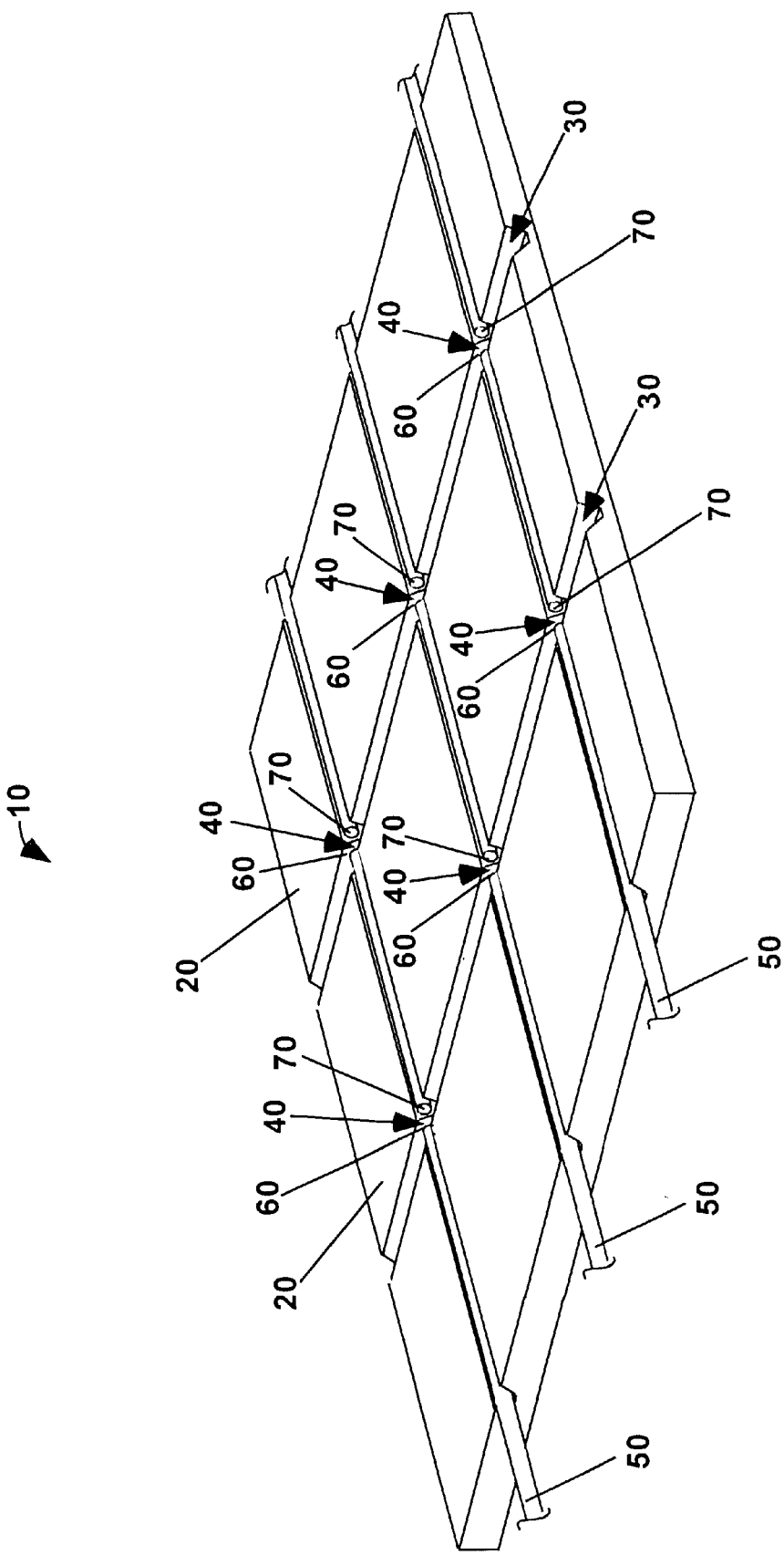
FIG. 4 is a perspective view of the extrinsic optical waveguide sensor where there are a plurality of interferometric regions and sample input regions.

FIG. 4 depicts an alternative embodiment where the holder 20 is modified so that a plurality sample input regions 30 exist along with a plurality of interferometric regions 40 which are formed between the optical fiber 50 endfaces 60 and the reflectors 70. In this embodiment, several samples are introduced into the sensor at one time. Use of this arrangement would depend on the final application.

Figure 5:
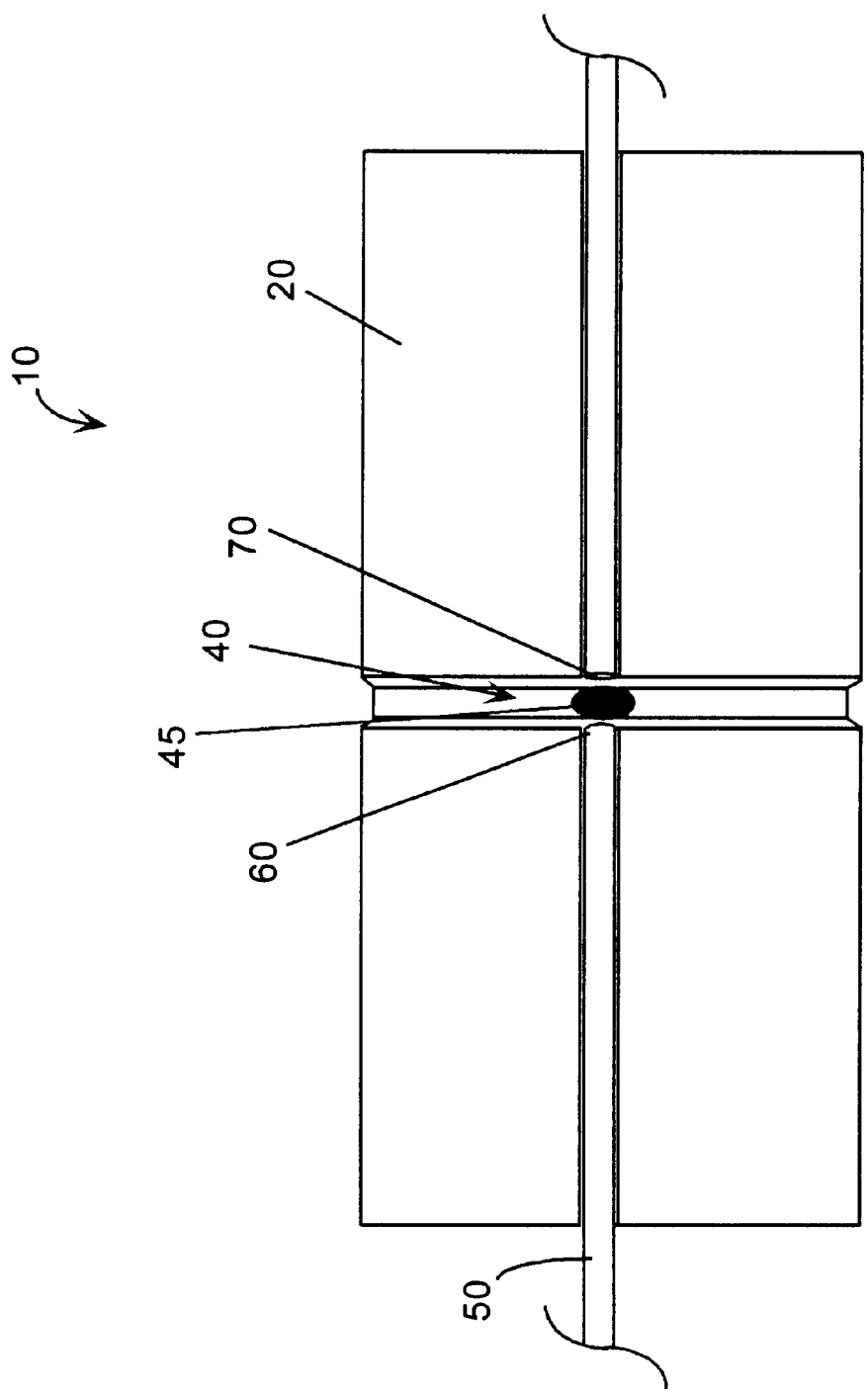
FIG. 5 is a top view of the extrinsic optical waveguide sensor of the present invention having a reactive coating disposed within the interferometric region.

FIG. 5 shows another embodiment of the sensor 10 wherein a reactive coating 45 is disposed within the interferometric region 40 formed by the operable relationship between the optical fiber 50 endface 60 and the reflector 70. The reactive coating 45 may be any reactive coating known to those skilled in the art and in particular is selected from the group consisting of: a physically reactive coating; an electronically reactive coating; and a chemically reactive coating. A physically reactive coating is one which is sensitive to pressure, temperature, strain, or shape. For example, a change in pressure alters the reactive coating such that it affects the refractive index within the interferometric cavity. A similar effect is seen for an electrically reactive coating where exposure to a magnetic field or electrical current causes a change in the refractive index of the coating. Lastly, a chemically reactive coating undergoes a chemical change when exposed to certain target materials. This reaction may either change the chemical or the physical make-up of the coating. More specifically, the reactive coating is selected from the group consisting of: a polymer; a hydrogel; a solgel; and an affinity film. The deposition of a reactive coating in the interferometric region permits in situ monitoring of a reaction as it occurs or monitoring after various selective reactions have taken place. As a liquid phase sample enters the holder 20 at the sample input region 30, it flows into the interferometric region 40 and reacts with the reactive coating 45. Various changes in the refractive index of the sample are monitored. Although FIG. 5 depicts the simplest embodiment of the invention wherein there is only one sample input region and one interferometric region, as discussed previously, the holder 20 may be modified to have several sample input regions and/or several interferometric regions and various combinations thereof.

In another embodiment, a reflective coating is disposed on the input/output optical fiber endface. The deposition of a reflective coating allows for the input/output optical fiber to either fully or partially reflect incident light allowing it to be partially transmissive. Any reflective coating known to those skilled in the art may be used. Preferably, the reflective coating is selected from the group consisting of: a dielectric coating; a multiple layer coating; and a metallic coating. A multiple layer coating, similar to a dielectric stack, is a combination of a ¼ wave thick and a ½ wave thick varying materials. These layers allow the user to reflect and tailor the transmission.

Alternatively, a reflective coating may be disposed on the reflector. As with the input/output optical fiber, the reflective coating allows for the full or partial reflection of incident light. Any reflective coating known to those skilled in the art may be used and in particular, the reflective coating is selected from the group consisting of: a dielectric coating; a multiple layer coating; and a metallic coating.

The use of reflective coatings may be on singular elements as described above or may be used in combination. For example, a first reflective coating is disposed on the optical fiber endface and a second reflective coating is disposed on the reflector.

The first and second reflective coatings are selected from the group consisting of: a dielectric coating; a multiple layer coating; and a metallic coating. The reflective coatings may be used in combination with a reactive coating to achieve a particularly desired result. In one embodiment, the reactive coating is disposed within at least one of the interferometric regions. In an alternative embodiment, the reactive coating is positioned such that it either partially or fully covers the first and second reflective coatings. Any reactive coating known to those skilled in the art may be used. Preferably, the reactive coating is selected from the group consisting of: a physically reactive coating; an electronically reactive coating; and a chemically reactive coating. In a most preferred embodiment, the reactive coating is selected from the group consisting of: a polymer; a hydrogel; a solgel; and an affinity film.

Figure 6A:
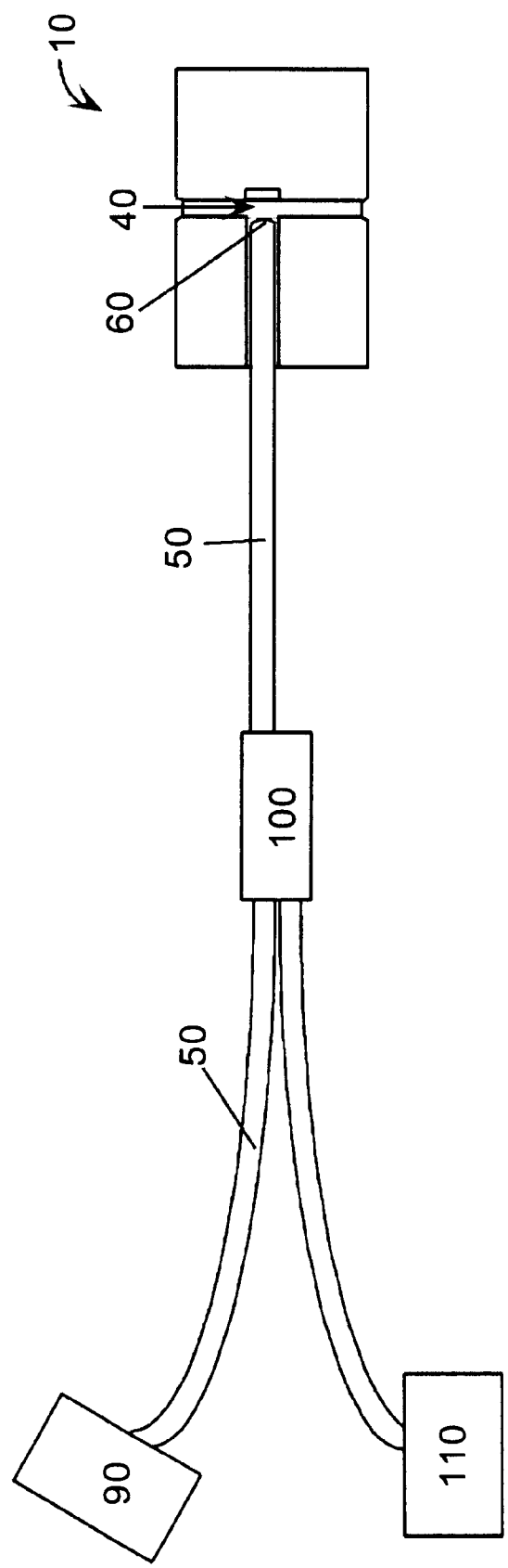
FIG. 6A depicts an arrangement of the extrinsic optical waveguide sensor of the present invention.

FIG. 6A depicts an arrangement of the extrinsic optical waveguide sensor 10 of the present invention. The extrinsic optical waveguide sensor 10 is arranged to further comprise a broadband light source 90 or a laser (not shown) positioned in an operable relationship to the optical fiber 50 at an end opposite from the optical fiber endface 60. Use of a broadband light source is preferred to allow for absolute information measurements through determination of spectral modulation whereas a laser permits for the measurement of differential information. A coupler 100 is positioned between the broadband light source and the interferometric region 40. The coupler may be any coupler known to those skilled in the art and in particular is a biconical tapered coupler. A detector 110 is positioned in an operable relationship to the coupler.

Figure 6B:
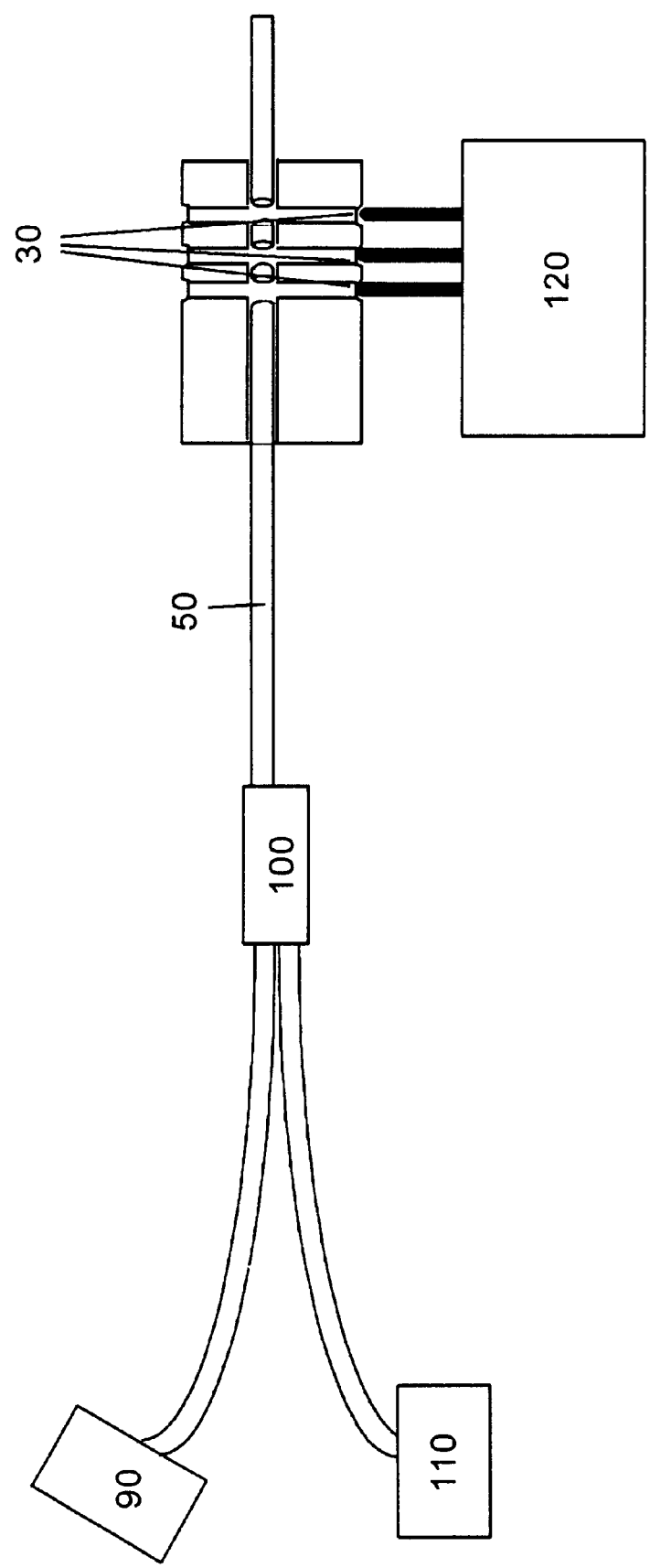
FIG. 6B depicts an arrangement of the extrinsic optical waveguide sensor of the present invention having a microfluidic device.

In a further embodiment shown in FIG. 6B at least one microfluidic device 120 is positioned in an operable relationship to each sample input region 30. The microfluidic device 120 is used to introduce the sample into the sample input region 30. Any microfluidic device known to those skilled in the art may be used. Specific examples include but are not limited to: pumps and filters.

When one desires to measure the in situ refractive index of a particular sample, the arrangement of the present invention may be used. The arrangement is provided and at least one sample is introduced into each sample input region. The interferometric measurements are recorded using the detector. In a further embodiment, at least one reactive coating is introduced into each sample input region before introducing each sample. Each sample is allowed to react with each reactive coating after each sample has been introduced into the sample input region. Samples may be input manually or by using a microfluidic device.

EXAMPLE

The extrinsic optical waveguide sensor arrangement described above was used to measure antigen/antibody binding events. A reactive coating was introduced within the interferometric region of the sensor. The coating allowed for specific binding of target molecules using ligands that capture the target within the coating. After a washing step to remove stringent non-specifically absorbed material, the increased density within the film caused a measurable net refractive index difference, which was correlated to the concentration of detected target molecules. To demonstrate the capability of the sensor to measure antigen-antibody interaction, the sensor was coated with encapsulated Protein-A-agarose.

The sensor was observed under a microscope and the sensor response was monitored while the Protein-A activated agarose was applied. When the coating was in place, a phosphate buffer was washed over the sensor to establish a sensogram baseline as a detection reference. One approach was to use the Protein-A to immobilize polyclonal rabbit antiserum against BSA (anti-BSA, 2 mg/ml) to the sensor surface and then sandwich goat anti-rabbit IgG and rabbit anti-goat IgG. The experiment demonstrated the specific binding events and amplification techniques based on mass.

The absorption of rabbit anti-BSA antibodies were sequentially measured while the increase in the optical path length (OPL) with each binding event was monitored. To generate the response plat, the encapsulated Protein-A was first washed with a phosphate buffer to establish a baseline for the sensogram. The sensor was then challenged with 2 mg/ml rabbit anti-BSA antisera (10 micrograms/ml of anti-BSA specific IgG), which naturally binds to the Protein-A.

Figure 7:
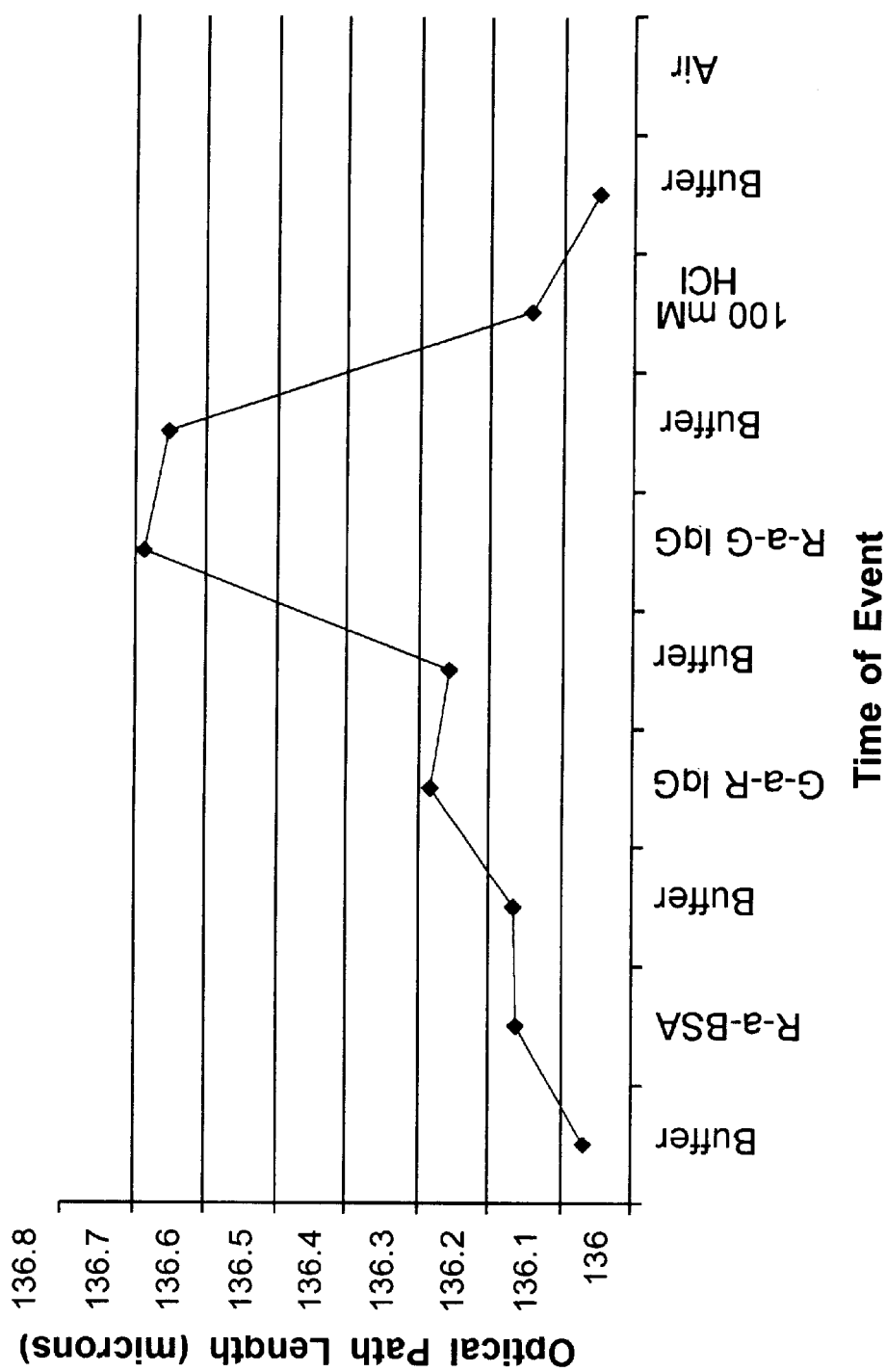
FIG. 7 is a sensogram plot showing sandwich assay response of protein-A sensor to rabbit anti-BSA, goat anti-rabbit IgG, and rabbit anti-goat IgG.

FIG. 7 shows the sensogram acquired using this format. The plot displays time of event on the x-axis and optical path length ($\mu$m) on the y-axis. This change in optical path length is due to a change in coating refractive index and is correlated to concentration of target molecules. The plot shows the baseline sensor response generated by exposing the sensor to 25 $\mu$l of phosphate buffer for 10–15 minutes. This baseline equilibrated at 136.067 $\mu$m. Next, the sensor was challenged with 20 $\mu$l of 2 mg/ml rabbit anti-BSA that resulted in an increase in the optical path length to 136.163 $\mu$m. To remove any unbound target, phosphate buffer solution was washed over the sensor. The sensor response indicated that the coating bound enough target (rabbit anti-BSA) to cause a shift in the OPL of 0.100 $\mu$m from the original baseline to 136.167 $\mu$m. Next, the sensor was then challenged with 20 $\mu$l of 1 mg/ml goat anti-rabbit IgG. After washing with phosphate buffer, this resulted in a total increase in the optical path length to 136.258 $\mu$m, indicating a total increase of 0.091 $\mu$m. The next binding event with 20 $\mu$l of 1 mg/ml rabbit anti-goat IgG resulted in an optical path length of 136.654 $\mu$m a total increase of 0.396 $\mu$m after washing with buffer. To investigate regeneration capabilities, the sensor was then washed with 100 mM HCL to remove the "antibody sandwich" from the Protein-A. Upon a final wash with the buffer, the sensor response returned close to its original optical path length of 136.143 $\mu$m. Slight variation from the start gap is a result of non-specific interactions, desorption after wash or elution, and temperature drift.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An extrinsic optical waveguide sensor comprising:
    a holder having at least one sample input region and at least one interferometric region;
    at least one optical fiber positioned in the holder, each optical fiber having an endface serving as an input and an output; and
    at least one reflector, each reflector positioned in the holder in an operable relationship to each optical fiber endface, wherein each optical fiber endface and each reflector define each interferometric region.

2. An extrinsic optical waveguide sensor according to claim 1, wherein the holder is a micromachined silicon wafer.

3. An extrinsic optical waveguide sensor according to claim 1, wherein each sample input region is nearly perpendicular to each interfometric region.

4. An extrinsic optical waveguide sensor according to claim 1, further comprising a lens positioned in an operable relationship to the optical fiber endface.

5. An extrinsic optical waveguide sensor comprising:
    a holder having at least one sample input region and at least one interferometric region;
    at least one optical fiber positioned in the holder, each optical fiber having an endface serving as an input and an output;
    at least one reflector, each reflector positioned in the holder in an operable relationship to each optical fiber endface, thus defining each interferometric region; and
    a lens, having a reflective coating disposed thereon, wherein the lens is positioned in an operable relationship to the optical fiber endface.

6. An extrinsic optical waveguide sensor comprising:
    a holder having at least one sample input region and at least one interferometric region;
    at least one optical fiber positioned in the holder, each optical fiber having an endface serving as an input and an output; and
    at least one reflector, each reflector positioned in the holder in an operable relationship to each optical fiber endface, thus defining each interferometric region and wherein the reflector is a second optical fiber endface.

7. An extrinsic optical waveguide sensor according to claim 1, wherein the reflector is a micromachined surface.

8. An extrinsic optical waveguide sensor comprising:
a holder having at least one sample input region and at least one interferometric region;
at least one optical fiber positioned in the holder, each optical fiber having an endface serving as an input and an output; and
at least one reflector, each reflector positioned in the holder in an operable relationship to each optical fiber endface, thus defining each interferometric region and wherein a reactive coating is disposed within at least one interferometric region.

9. An extrinsic optical waveguide sensor according to claim 8, wherein the reactive coating is selected from the group consisting of: a physically reactive coating; an electronically reactive coating; and a chemically reactive coating.

10. An extrinsic optical waveguide sensor according to claim 8, wherein the reactive coating is selected from the group consisting of: a polymer; a hydrogel; a solgel; and an affinity film.

11. An extrinsic optical waveguide sensor comprising:
a holder having at least one sample input region and at least one interferometric region;
at least one optical fiber positioned in the holder, each optical fiber having an endface serving as an input and an output;
a reflective coating disposed on the optical fiber endface; and
at least one reflector, each reflector positioned in the holder in an operable relationship to each optical fiber endface, thus defining each interferometric region.

12. An extrinsic optical waveguide sensor according to claim 11, wherein the reflective coating is selected from the group consisting of: a dielectric coating; a multiple layer coating; and a metallic coating.

13. An extrinsic optical waveguide sensor comprising:
a holder having at least one sample input region and at least one interferometric region;
at least one optical fiber positioned in the holder, each optical fiber having an endface serving as an input and an output;
at least one reflector, each reflector positioned in the holder in an operable relationship to each optical fiber endface, thus defining each interferometric region; and
wherein a reflective coating is disposed on the reflector.

14. An extrinsic optical waveguide sensor according to claim 13, wherein the reflective coating is selected from the group consisting of: dielectric coating; a multiple layer coating; and a metallic coating.

15. An extrinsic optical waveguide sensor comprising:
a holder having at least one sample input region and at least one interferometric region;
at least one optical fiber positioned in the holder, each optical fiber having an endface serving as an input and an output;
at least one reflector, each reflector positioned in the holder in an operable relationship to each optical fiber endface, thus defining each interferometric region; and
a first reflective coating disposed on the optical fiber endface and a second reflective coating disposed on the reflector.

16. An extrinsic optical waveguide sensor according to claim 15, wherein the first reflective coating and the second reflective coating is selected from the group consisting of: a dielectric coating; a layer coating; and a metallic coating.

17. An extrinsic optical waveguide sensor according to claim 15, further comprising a reactive coating disposed within at least one interferometric region.

18. An extrinsic optical waveguide sensor according to claim 17, wherein the reactive coating is selected from the group consisting of: a physically reactive coating; an electronically reactive coating; and a chemically reactive coating.

19. An extrinsic optical waveguide sensor according to claim 17, wherein the reactive coating is selected from the group consisting of: a polymer; a hydrogel; a solgel; and an affinity film.

20. An extrinsic optical waveguide sensor comprising:
a holder having at least one sample input region and at least one interferometric region;
at least one optical fiber positioned in the holder, each optical fiber having an endface serving as an input and an output;
at least one reflector, each reflector positioned in the holder in an operable relationship to each optical fiber endface, thus defining each interferometric region; and
a broadband light source positioned in an operable relationship to the optical fiber at an end opposite from the optical fiber endface; a coupler positioned between the broadband light source and the interferometric region; and a detector positioned in an operable relationship to the coupler.

21. An extrinsic optical waveguide sensor according to claim 20, further comprising at least one microfluidic device positioned in an operable relationship to each sample input region.

22. A process for measuring refractive index, the process comprising the steps of:
a) providing an extrinsic optical waveguide sensor comprising: a holder having at least one sample input region and at least one interferometric region; at least one optical fiber positioned in the holder, each optical fiber having an endface serving as an input and an output; and at least one reflector, each reflector positioned in the holder in an operable relationship to each optical fiber endface, wherein each optical fiber endface and each reflector define each interferometric region; a broadband light source positioned in an operable relationship to the optical fiber at an end opposite from the optical fiber endface; a coupler positioned between the broadband light source and the interferometric cavity; and a detector positioned in an operable relationship to the coupler;
a) introducing at least one sample into each sample input region; and
b) recording interferometric measurements using the detector.

23. A process for measuring refractive index, the process comprising the steps of:
a) providing an extrinsic optical waveguide sensor comprising: a holder having at least one sample input region and at least one interferometric region; at least one optical fiber positioned in the holder, each optical fiber having an endface serving as an input and an output; and at least one reflector, each reflector positioned in the holder in an operable relationship to each optical fiber endface, thus defining each interferometric region; a broadband light source positioned in an operable relationship to the optical fiber at an end opposite from the optical fiber endface; a coupler positioned between the broadband light source and the interferometric cavity; and a detector positioned in an operable relationship to the coupler;

b) introducing at least one reactive coating into each sample input region;

c) introducing at least one sample into each sample input region; and d) recording interferometric measurements using the detector.

24. A process according to claim 23, wherein the reactive coating is selected from the group consisting of: a polymer; a hydrogel; a solgel; and an affinity film.

25. A process according to claim 23, further comprising the step of allowing each sample to react with each reactive coating after each sample has been introduced.

26. A process according to claim 22, wherein each sample is introduced through a microfluidic device.

* * * * *